United States Patent [19]

Tamburelli

[11] 4,170,758

[45] Oct. 9, 1979

[54] PROCESS AND DEVICE FOR THE NONLINEAR EQUALIZATION OF DIGITAL SIGNALS

[75] Inventor: Giovanni Tamburelli, Turin, Italy

[73] Assignee: CSELT—Centro Studi e Laboratori Telecomunicazioni S.p.A., Turin, Italy

[21] Appl. No.: 809,450

[22] Filed: Jun. 23, 1977

[30] Foreign Application Priority Data

Jun. 25, 1976 [IT] Italy ............................... 68561 A/76
Sep. 30, 1976 [IT] Italy ............................... 69333 A/76
Feb. 20, 1977 [IT] Italy ............................... 67417 A/77

[51] Int. Cl.² .................... H04B 1/10; H03K 5/159
[52] U.S. Cl. ................................. 325/42; 178/88; 325/324; 325/477; 364/724
[58] Field of Search ............ 364/574, 724; 325/42, 325/320, 323, 324, 477; 329/104, 110, 112, 122; 178/88

[56] References Cited

U.S. PATENT DOCUMENTS

| | | | |
|---|---|---|---|
| 3,755,738 | 8/1973 | Gitlin et al. | 325/42 |
| 3,855,539 | 12/1974 | Croisier | 325/320 |
| 3,914,691 | 10/1975 | Meadors, Jr. | 325/324 |
| 3,972,000 | 7/1976 | Desblache et al. | 325/323 |
| 3,993,956 | 11/1976 | Gilmore et al. | 325/324 |
| 4,025,719 | 5/1977 | Nussbaumer | 325/42 |
| 4,032,847 | 6/1977 | Unkauf | 325/323 |
| 4,076,956 | 2/1978 | Dogliotti et al. | 178/88 |

OTHER PUBLICATIONS

Osatake et al., Error Rate Improvement Through Digital Decision in Pulse Transmissions, Electronics and Communications in Japan, vol. 49, No. 10, Oct. 1966, pp. 28-35.
Salazar, Design of Transmitter and Receiver Filters for Decision Feedback Equalization, The Bell System Technical Journal, vol. 53, No. 3, Mar. 1974, pp. 503-523.
Gitlin et al., Passband Equalization of Differentially Phase-Modulated Data Signals, The Bell System Technical Journal, vol. 52, No. 2, Feb. 1973, pp. 219-238.

*Primary Examiner*—Felix D. Gruber
*Attorney, Agent, or Firm*—Karl F. Ross

[57] ABSTRACT

A receiver of digital signal pulses, operating with a sampling period T, comprises an equalizer which includes at least one feedback loop from the output of a decision unit for subtracting from an incoming signal pulse a value corresponding to the magnitude of a tail or postcursor of a preceding signal pulse. The signal pulse thus purged of postcursor interference is delayed by one or more sampling periods T for algebraic combination with one or more fed-forward compensating signals each representing the estimated value of an interfering precursor sample, these compensating signals being derived from the outputs of respective decision units with the aid of filters.

2 Claims, 8 Drawing Figures

PROCESS AND DEVICE FOR THE NONLINEAR EQUALIZATION OF DIGITAL SIGNALS

FIELD OF THE INVENTION

My present invention relates to digital transmission systems and more particularly to a process and a device for the equalization of digital signals with nonlinear correction extended to response-pulse precursors, suitable also for transmission at rates faster than Nyquist's.

BACKGROUND OF THE INVENTION

It is known that in high-rate digital data transmission the degradation of the signal is mainly due to the so-called "intersymbol interference". This is caused by the fact that, owing to non-ideal characteristics of the transmission channel, every pulse containing the digital information is associated with so-called postcursors (tails) and precursors which overlap and distort adjacent pulses.

Such interference, if too strong, makes the decision on the transmitted signal incorrect; besides, it increases as transmission rate increases, so as to represent the biggest obstacle to the rate increase, thus preventing a cheaper exploitation of the transmission lines.

At the receiving side, it is therefore necessary to have devices able to compensate the harmful effects of intersymbol interference, both for the signal portion representing the precursors of the pulses following the one on which the decision is taken, and for the signal portion representing the postcursors of the preceding pulses.

Such compensation is obtained by the use of suitable filters, known as equalizers.

It is well known in the literature that favorable results in the equalization with respect to interference phenomena due to postcursors have been attained by utilizing nonlinear structures, for instance those of the decision-feedback type.

For the equalization with respect to phenomena due to the precursors a correction of linear type is usual.

The combined use of the two techniques allows to obtain better results than those attainable by only linear equalization, but it does not allow high transmission rates, with acceptable performance; in fact, at such rates the degradation component due to precursors considerably increases, and it is difficult to be compensated by linear equalization, which also causes an increase of the noise power degrading the performance.

As the present digital-transmission techniques are developing systems with ever higher transmission rate, researches aiming for the realization of an equalizer embodying the principle of precursor compensation through decision feedback are becoming more and more important.

A solution of this problem has been given by R. T. Boyd and F. C. Monds in a paper entitled "Equalizer for digital communication" (Electronics Letters, 28 Jan. 1971, Vol. 7, No. 2, pp. 58–60).

This paper describes a nonlinear equalizer with decision feedback, in which an iterative correction of errors due to symbol precursors and postcursors is achieved through transversal filters.

The practical embodiment of such a system is rather difficult because, in order to obtain a good correction of postcursor errors, it is necessary to repeat more than once the decision feedback as the precursor-error probability is reduced; that obviously entails an iteration of the transversal filter performing such feedback.

Besides, the described system is not suitable for use in the equalization of phase-modulated signals, for which further filters must be used to compensate the interference caused by the quadrature components of the signal (interchannel interference), with consequent increased complexity.

OBJECT OF THE INVENTION

The object of my invention is to provide an improved process and system designed to carry out, in a non-iterative way, the compensation of errors due to the postcursors and to be used, with slight modifications, both for baseband signals and for phase-modulated or phase-and-amplitude-modulated signals.

SUMMARY OF THE INVENTION

In accordance with one aspect of my invention, postcursor and precursor interference is eliminated from a train of incoming digital signals by subjecting a given incoming signal to a first decision operation establishing a first decided pulse which has one of several predetermined signal levels (as is well known per se) and from which a feedback pulse adapted to correct postcursor interference and a feed-forward pulse adapted to compensate for precursor interference are derived. The feedback pulse is algebraically combined with a subsequent incoming signal, before this signal is subjected to the first decision operation, whereas the feed-forward pulse derived from that subsequent signal is algebraically combined with the given incoming signal which is sufficiently delayed for this purpose. The signal resulting from the latter step is subjected to a second decision operation which produces a second decided pulse.

An equalizer designed to implement this series of steps comprises, pursuant to another aspect of my invention, receiving means connected to the transmission path carrying the incoming signals, first threshold means connected to the receiving means for performing the first decision operation, filter means connected to the first threshold means for generating the feedback and feed-forward pulses, first summing means inserted between the receiving means and the first threshold means for algebraically combining the feedback pulse with the subsequent incoming signal, second summing means receiving the feed-forward pulse on one input and the delayed incoming signal on another input for algebraically combining same, and second threshold means connected to the second summing means for carrying out the second decision operation.

The filter means may comprise a single filter, in which case the feedback and feed-forward pulses are identical, or separate feedback and feed-forward filters.

In accordance with a further feature of my invention, the equalizer may include a plurality of cascaded cells the first of which encompasses the aforementioned filter means, first threshold means and first summing means while the second one comprises the second threshold means and second summing means as well as other filter means for deriving a second feed-forward pulse from the second decided pulse. The second feed-forward pulse is algebraically combined with a still-later incoming signal, suitably delayed, by third summing means working into third threshold means for the generation of a third decided pulse.

BRIEF DESCRIPTION OF THE DRAWING

The above and other features of my present invention will now be described in detail with reference to the accompanying drawing in which.

SPECIFIC DESCRIPTION

Figure 1:
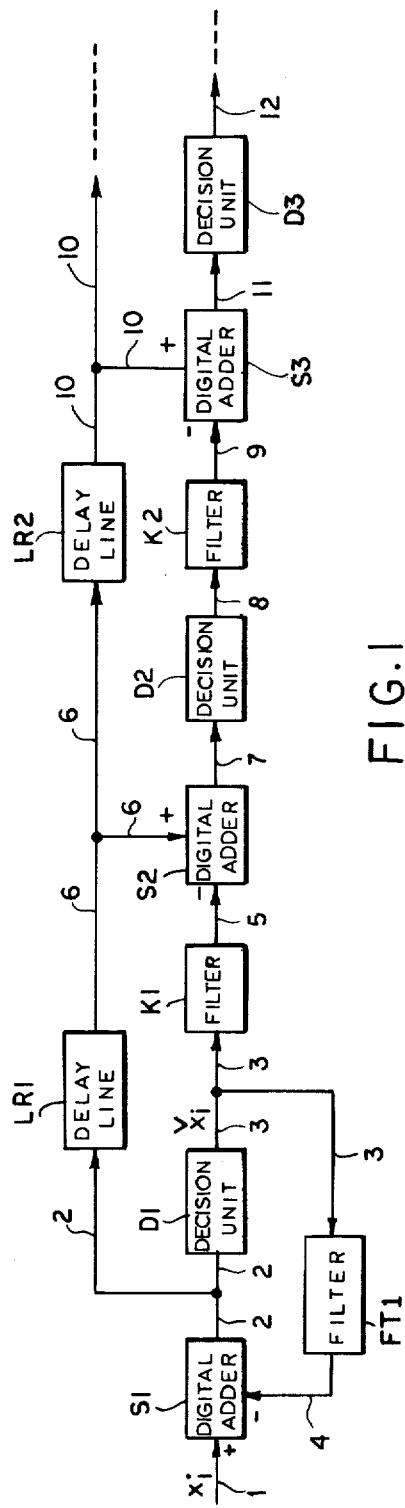
FIG. 1 is a block diagram of an equalizer, representing a first embodiment of the invention, which can be utilized for the baseband signals.

In FIG. 1, reference 1 denotes a generic transmission channel conveying digital signals containing information symbols $x_i$, having a recurrence period T, which are to be equalized. As the system here involved is of digital type, the real interference to be compensated is due to samples both of the precursor and of the postcursor of any signal pulse. Though I may refer hereinafter, for the sake of simplicity, to "precursors" or "postcursors", it is evident that samples thereof are generally meant.

Reference S1 denotes a conventional two-input and one-output digital adder, designed to calculate the difference between the signal $x_i$ present at the input connected to channel 1 and a signal compensating the postcursor, present at another adder input connected to a lead 4. Signal $x_i$ is sampled at uniform intervals, by means not shown separately, as more fully described hereinafter.

Reference D1 denotes a conventional threshold decision device adapted to identify pulses arriving from adder S1 on a connection 2 and to emit via an output connection 3 the decided symbols $\check{x}_i$.

Reference FT1 denotes a conventional filter (which can but need not have a transversal structure) serving to generate in a conventional manner, on the basis of decided symbols $\check{x}_i$ and of the channel characteristics, a corrective signal for the interfering postcursor samples fed back on lead 4. Symbol $\check{x}_i$ is a pulse having one of several predetermined signal levels as is well known per se.

The set of circuits S1, D1, FT1 constitutes a nonlinear equalizer with decision feedback, well known to the skilled in the art.

Reference K1 denotes a filter conventionally designed to obtain from decided symbols $\check{x}_i$ and from the known channel characteristics the value of the interfering precursor samples, this value being read out on an output connection 5. The complexity of such a filter (i.e. the number of cells if it has a transversal structure) will depend on the number of interfering samples associated with each pulse, i.e. on the transmission rate.

In the simpler cases, in which pulses present only one interfering precursor sample, filter K1 is reduced to a simple multiplier.

Reference LR1 denotes a conventional delay line, serving to delay pulses with compensated postcursor, which appear on connection 2, so as to allow the arrival of the compensation signal obtained from the decision of the subsequent pulse.

Reference S2 denotes a further digital adder, this too of any known type, performing a subtraction between the signal free from the postcursor, received on connection 6, and the value of the interfering precursor sample affecting the same signal, received on connection 5.

Reference D2 denotes a second threshold decision device operating on the signals which result from the algebraic combination of pulses in adder S2, i.e. on symbols purged of the postcursors and precursors, present on connection 7; the corrected and decided symbols appear on an output lead 8 of device D2.

References K2, LR2, S3, D3 denote units having the same structure and the same functions as units K1, LR1, S2, D2, respectively; connections 9, 10, 11, 12 will therefore carry signals corresponding to those present on connections 5, 6, 7, 8, respectively.

The equalization network or cell formed by units K2, LR2, S3, D3, and possible further equalization cells having the same structure, can be added to the device to compensate a possible decision error or to ameliorate the corrections performed in the first cell, as will be further described hereinafter.

Figure 2:
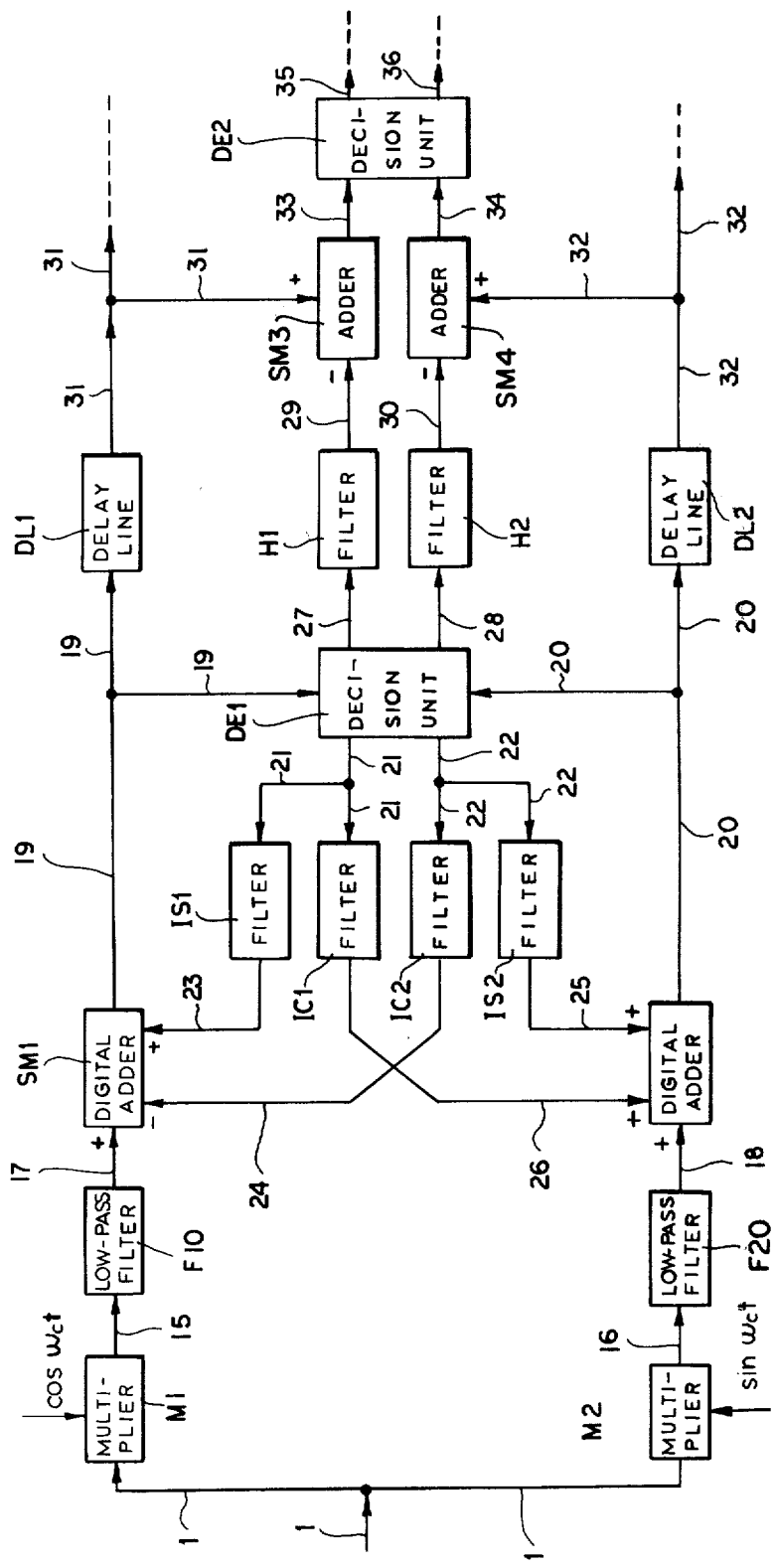
FIG. 2 is a block diagram of an equalizer representing another embodiment which can be utilized for phase-modulated and phase-and-amplitude-modulated signals.

FIG. 2 shows the layout of an equalizer to be employed for phase-modulated or phase-and-amplitude-modulated signals.

In FIG. 2, reference 1 denotes again the transmission channel; references M1, M2 denote two conventional multipliers which, as usual in this art, respectively multiply the arriving signal by functions $\cos \omega_c t$ and $\sin \omega_c t$ ($\omega_c$ being the pulsatance of the carrier), thus carrying out a demodulation of the received signal. Unit M1 emits on an output connection 15 the in-phase component of the demodulated signal whereas unit M2 delivers on an output connection 16 the quadrature component of the demodulated signal.

References F10, F20 denote two conventional low-pass filters eliminating the high-frequency components from the signals present on connections 15 and 16, respectively, while possibly shaping these signals in such a way as to make easier the subsequent feedback operations.

References SM1, SM2 denote two digital adders which algebraically add the filtered signals, present on connections 17 and 18 respectively, to compensation signals for the postcursors of the intersymbol interference, present on connections 23 and 25, respectively, and to compensation signals for the postcursors of the interchannel interference, present on connections 24 and 26, respectively.

Reference DE1 denotes a decision unit which, by respectively receiving through connections 19 and 20 the in-phase and quadrature components of the signals, derives from these components the information relative to the amplitude level Ak and to the characteristic phase angle $\phi_k$ and emits on output connections 21, 22 and 27, 28 the decided symbols relative to the two components, either the trigonometric functions $\cos \phi_k$, $\sin \phi_k$ of that angle, if only phase modulation is involved, or the products Ak·$\cos \phi_k$, Ak·$\sin \phi_k$ if phase and amplitude modulation is present.

Decision units of this type are described for instance in the paper "Generalized decision feedback receiver for PSK and APSK signals" (CSELT Rapporti Technici - Vol. 3, No. 4 - December 1975) by R. Dogliotti, U. Mazzei, G. Tamburelli. See also may prior U.S. Pat. No. 4,029,903.

References IS1, IS2 denote a pair of filters designed to obtain signals compensating the samples of the intersymbol-interference postcursors from signals present on connections 21 and 22 for in-phase and quadrature components, respectively, of the signals arriving on channel 1. Filters IS1, IS2 operate with direct feedback to the originating adders SM1, SM2, respectively.

References IC1, IC2 denote a further pair of filters serving to obtain signals compensating the interchannel-interference postcursors from signals present on connections 21 and 22, for the in-phase and quadrature components, respectively, of signals arriving on channel 1. Filters IC1, IC2 operate with cross-feedback to the respectively opposite adders SM2, SM1.

Filters of this kind are well known and are used in conventional feedback equalizers represented by the units so far described in the system of FIG. 2.

References H1, H2 denote filters deriving from symbols decided in unit DE1, respectively for the in-phase and quadrature components of signals received through channel 1, the values of interfering samples of precursors of such signals. Filters H1, H2 can also be simple multipliers when only one interfering precursor sample is present.

References DL1, DL2 denote two identical delay lines serving to delay signals present on connections 19 and 20, respectively, by the time necessary to allow the arrival of signals compensating the interfering precursor samples.

References SM3, SM4 denote two further adders which subtract the values of precursor samples of in-phase and quadrature signals, present on connections 29, 30, respectively, from information signals respectively arriving over delay lines DL1, DL2 on connections 31, 32.

Reference DE2 denotes a second decision unit, this too of well-known type, operating on symbols purged of precursors and post-cursors.

At the output of unit DE2, on connections 35, 36, there appear the decided symbols relative to the two components of the signal, which can be further compensated in equalization cells comprising units analogous to units DL1, DL2, H1, H2, SM3, SM4, DE2.

Figure 3:
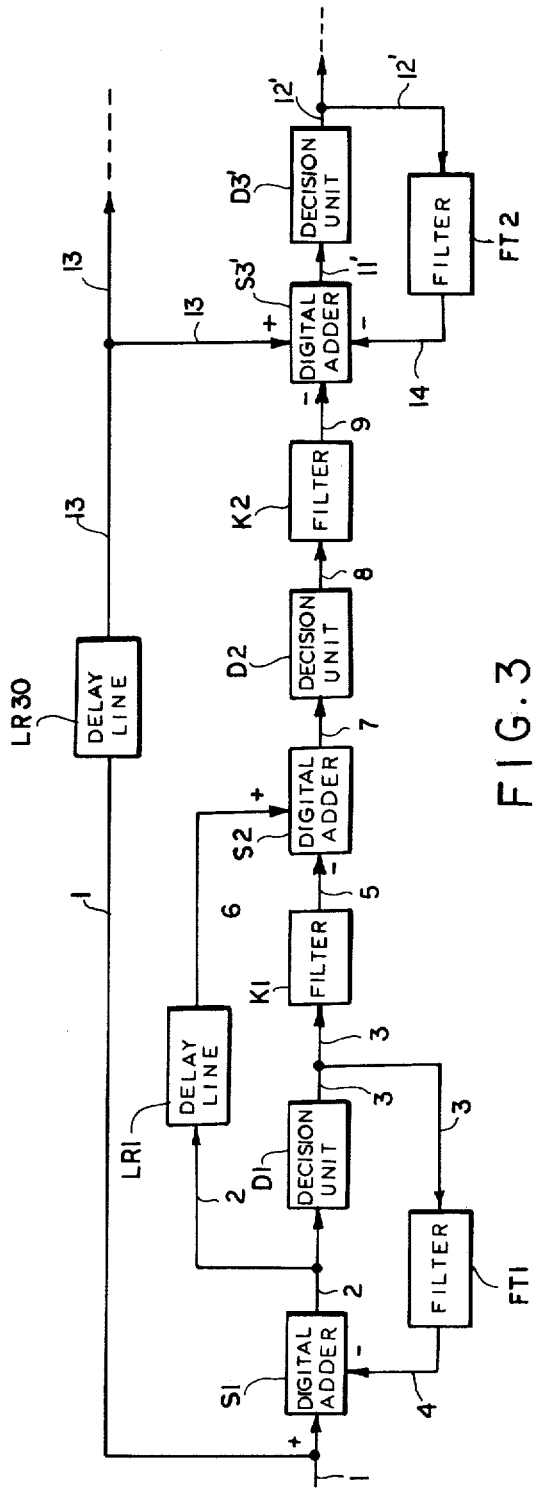
FIGS. 3 to 8 are block diagrams illustrating modifications of the equalizer shown in FIG. 1.

FIG. 3 shows an embodiment particularly suitable when a single postcursor compensation is not sufficient. A signal arriving on channel 1 is delayed in a line LR30 for a time equal to the entire delay caused by lines LR1, LR2 (FIG. 1).

Reference S3' (FIG. 3) denotes a three-input and one-output adder adapted to subtract from signals arriving on channel 1, delayed by line LR30 and present on a connection 13, both the signals present on connecting 9, corresponding to the values of the interfering precursor samples obtained from the already corrected symbols, and the signals present on a connection 14, forming further postcursor-correction signals.

Reference D3' denotes a conventional decision circuit, having a structure similar to that of unit D3, operating on the output signals of adder S3', present on a connection 11'.

Reference FT2 denotes a further filter, analogous to unit FT1 and adapted to generate the further postcursor-correction signals upon receiving the output of unit D3' on a lead 12'.

Figure 4:
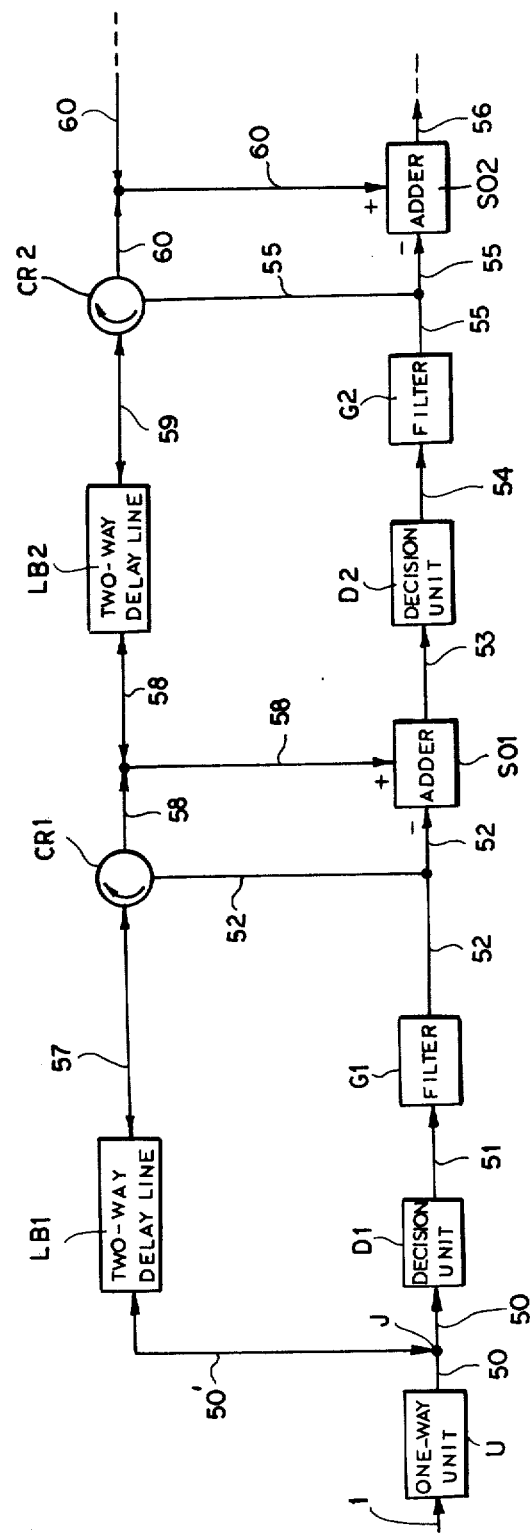

FIG. 4 shows a modified embodiment to be utilized when only one interfering sample is present both for the postcursor and for the precursor, and the magnitudes of these samples are substantially the same.

In this Figure, reference U denotes a conventional unidirectional unit allowing only one-way pulse propagation as indicated by the arrow, i.e. from connection 1 to a connection 50.

Reference G1 denotes a filter, which may consist of a simple multiplier, deriving compensation signals for the interfering precursor and postcursor samples from symbols decided in unit D1, which are present on a connection 51.

Such a signal is supplied by filter G1, through a connection 52, to a circulator CR1 and an adder SO1; the tasks of these circuits will be described hereinafter.

Reference LB1 denotes a bidirectional delay line which, by introducing suitable delays, is effective in one direction to transfer the pulses coming from channel 1 to the subsequent cells of the equalizer, whereas in the opposite direction it feeds back the compensation signal for the postcursor to the arriving pulses.

Signals entering line LB1 or outgoing from it are conveyed on one side by a bidirectional branch 50' of connection 50, and on the other side by a connection 57. A junction J between leads 50 and 50' acts here as a first summing means (a role played by adder S1 in FIGS. 1 and 3), with adder SO1 constituting a second summing means.

The three-gate circulator CR1 serves, on the one hand, to supply delay line LB1 via connection 57 with signals fed back from filter G1 on connection 52, and on the other hand to transfer on a connection 58 the pulses arriving from line LB1 over connection 57.

Adder SO1 subtracts the compensation signals, fed forward by filter G1 via connection 52, from pulses arriving at the input connected to link 58; it also supplies on a connection 53 signals purged of precursor as well as postcursor interferences.

Units LB2, G2, CR2, SO2 act in the same way as units LB1, G1, CR1, SO1; thus, signals corresponding to those present on connections 51, 52, 53, 57, 58 will be present on connections 54, 55, 56, 59, 60, respectively. Adder SO2 represents a third summing means.

If several interfering postcursor samples are to be taken into account, the decision feedback may be distributed among several cells, provided that the signals to be equalized are delayed in every cell by a time equal to a symbol period T.

In this way the errors due to postcursor interference can be compensated without employing complex filters (i.e. circuitry comprising a plurality of delay lines) in the decision-feedback loop, and also the propagation of decision errors inherent in the postcursor compensation is reduced.

The equalizer may then have the structure shown in FIGS. 5 to 8.

Figure 5:
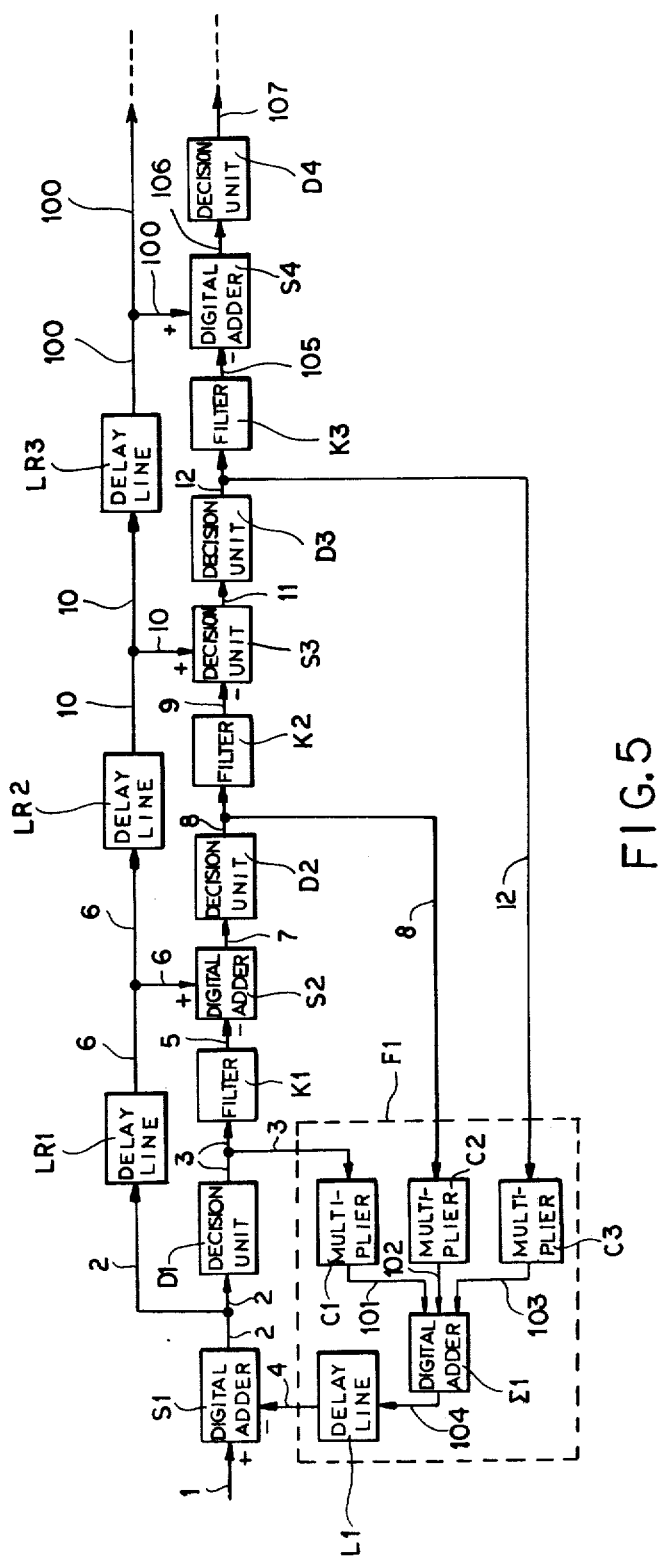

It is to be noted that in FIG. 5 a further cell for precursor equalization has been added, with respect to FIG. 1, in order to allow a better understanding of these embodiments of the invention; this cell is identical to the previous ones and comprises a delay line LR3, a filter K3, an adder S4 and a decision device D4. References 100, 105, 106, 107 denote the output connections of the unit of the additional cell.

In the equalizer of FIG. 5 delay lines LR1, LR2, LR3 each impose a delay equal to a symbol period T upon the postcursor-compensated signals they receive through connections 2, 6 and 10, respectively.

The output connections 8, 12, 107 of decision devices D2, D3, D4 respectively carry, at each instant, the decided symbols relating to the pulses which precede by respective times T, 2T, 3T the pulse present at the input of the decision device D1. It is thus possible to obtain the compensation signals of the interfering postcursor samples subsequent to the first one from symbols present on the outputs of decision devices D2, D3, . . . and not only from symbols decided in unit D1.

With this arrangement, filter FT1 of FIG. 1 (which generally has a transversal structure and therefore is difficult to be realized if several samples are to be compensated) may be replaced by a block F1.

In this block, references C1, C2, C3 denote three conventional multipliers each adapted in well-known manner to generate a compensation signal of an interfering postcursor sample. To this end, through connections 3, 8, 12, multipliers C1, C2, C3 receive the symbols decided in units D1, D2, D3, respectively.

Three multipliers C1–C3 are shown in the drawing, yet it is clear that their number will depend on the number of interfering postcursor samples which are to be taken into account for the equalization.

At $\Sigma_1$ I have indicated a conventional digital adder serving to sum up the compensation signals generated by multipliers C1, C2, C3 and present at its inputs linked to connections 101, 102, 103.

Reference L1 denotes a further delay line designed to delay by a time T, equal to the symbol period, the compensation signal outgoing from summer $\Sigma_1$ through a connection 104.

Figure 6:
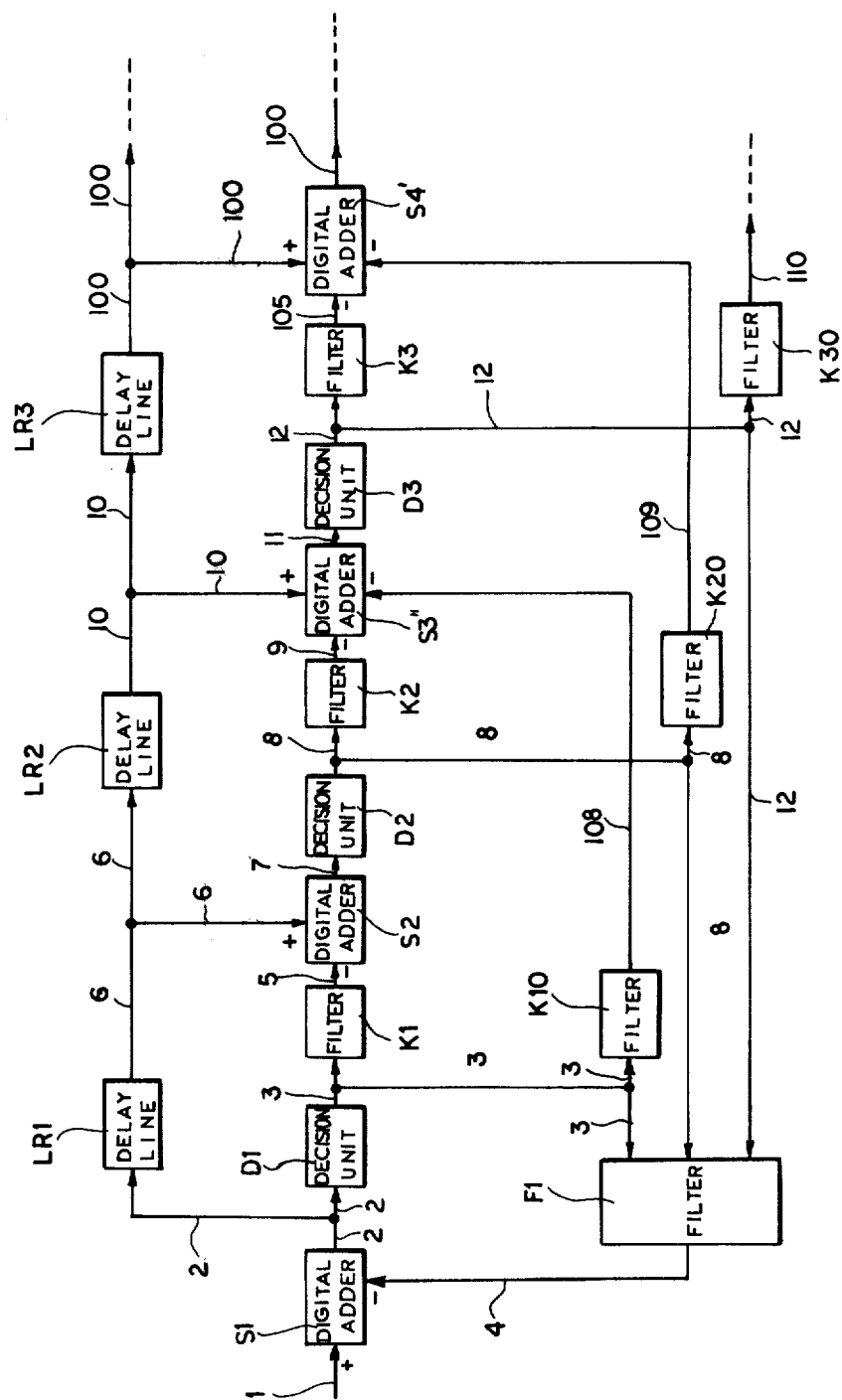

FIG. 6 shows a variant of the equalizer of FIG. 5 designed to provide better compensation of the interfering precursor samples following the first one.

In this Figure, reference K10 denotes a filter analogous to unit K1 and adapted to obtain from the decided symbol, present on connection 3, a signal utilized, as will be described hereinafter, to compensate the interfering precursor sample which precedes by a time 2T the maximum value of the impulse response, i.e. the second interfering precursor sample.

Reference S3" denotes a conventional three-input and one-output adder subtracting from the postcursor-free pulses the compensation signals of the interfering precursor samples it receives from filters K2 and K10 through connections 9 and 108, respectively.

References K20 and K30 denote two further filters, analogous to component K10, which receive through connections 8 and 12 the symbols decided in units D2 and D3, respectively, and operate on these symbols in the same way as filter K10 does on symbols decided in unit D1.

Therefore, values of the second interfering precursor sample will be present at the outputs of filters K20 and K30 on connections 109 and 110; these values are calculated with better approximation, as they are obtained from symbols which have already undergone at least one first compensation of the same precursor.

The signal generated by filter K20 is sent to an adder S4', identical to adder S3" and serving to subtract from the signals received from delay line LR3, through connection 100, both the compensation signal generated by filter K20 and the signal generated by filter K3.

The output signal of filter K30 can be utilized by a possible further equalizing cell.

Figure 7:
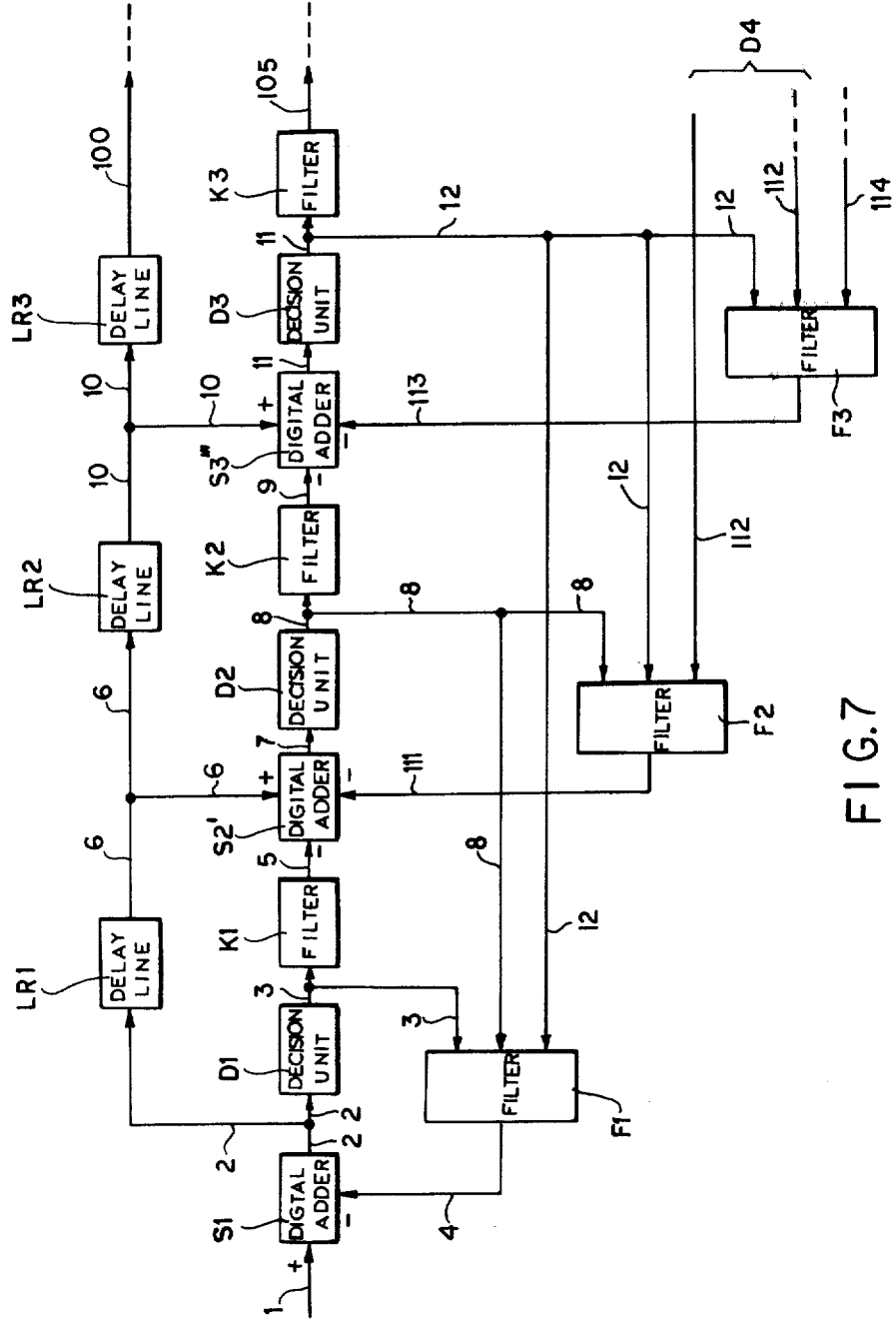

In FIG. 7, references F2 and F3 denote filters having a structure quite analogous to the one shown in FIG. 5 for filter F1. Filter F2 generates a second postcursor-compensation signal by utilizing symbols decided in units D2, D3 and D4 which it receives through connections 8, 12, 112; filter F3 operates in the same way by utilizing the symbols decided in units D3, D4 and the one decided in the possible subsequent cell of the equalizer, the latter symbol being sent to filter F3 through a connection 114.

References S2', S3" denote two conventional three-input and one-output adders which subtract precursor-compensation signals, supplied by filters K1 and K2, as well as the further postcursor-compensation signals, supplied by filters F2 and F3, from signals which have undergone a first postcursor compensation and are present on connections 6 and 10, respectively.

Figure 8:
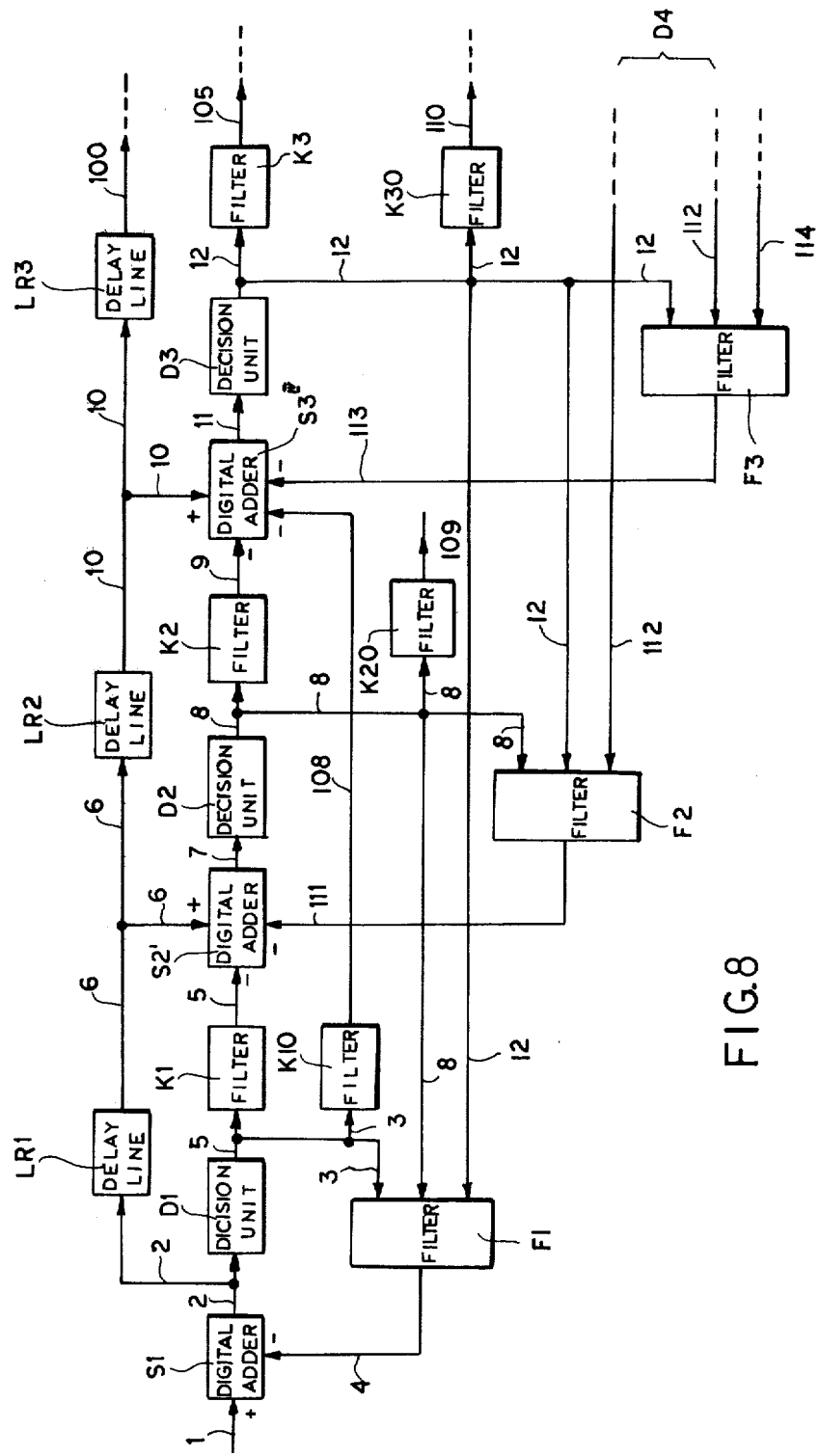

In FIG. 8, filters K10, K20, K30 are connected in parallel with filters K1, K2, K3, as in FIG. 6, to the leads 3, 8 and 12. Moreover, adder S3''' of FIG. 7 is replaced by a four-input and one-output adder S3$^{IV}$ designed to subtract, from signals present on connection 10 which have undergone the first postcursor compensation, a further postcursor-compensation signal, supplied by filter F3 through connection 113, as well as the two precursor-compensation signals supplied by filter K2 through connection 9 and by filter K10 through connection 108, respectively.

The adders of the subsequent cells, which are not represented in the drawing, are to be modified in a similar way.

OPERATION

In order to establish a correct time reference, the maximum value or peak of the response to an incoming signal pulse $x_i$ will be assumed to the present on channel 1, at the input of the equalizer, at instant $t_i$; therefore, at the same instant, pulses $x_{i-1}$, $x_{i-2}$ etc, preceding pulse $x_i$ by one, two etc. sampling periods, will be present at the outputs of respective delay lines LR1, LR2 etc. (FIG. 1).

In the equalizer of FIG. 1, the effects on pulse $x_i$ of the postcursors of the preceding pulses are compensated by the correction signal issuing from filter FT1 on connection 4.

The corrected signal, present on connection 2, is sent both to decision device D1 (which emits the decided symbol $x_i$) and to delay line LR1.

The decided symbol is sent, through connection 3, both to filter FT1, which determines the correction signal for the subsequent pulse $x_{i+1}$, and to filter K1, which estimates the value of the interfering sample of the precursor of pulse $x_i$ on the basis of the characteristics of the channel. That value is fed forward, through connection 5, to adder S2 which receives at its other input the signal $x_i$, previously purged of the postcursor interference and delayed by line LR1 so as to arrive there concurrently with the signal coming from filter K1. Adder S2 subtracts from signal $x_{i+1}$ the precursor interference due to pulse $x_i$ and emits on connection 7 a resulting signal in which that interference has likewise been compensated.

This resulting signal, decided in unit D2, is sent to subsequent units of the receiver or, in case the equalizer comprises more than one cell, to filter K2 which will estimate a new value of the interfering sample of the precursor of signal $x_{i-1}$; that value will again be fed forward and subtracted in adder S3 from symbol $x_{i-2}$, purged of the postcursor, delayed by lines LR1 and LR2 and present on connection 10; the new corrected value will then be decided in unit D3 and supplied to the subsequent equalization cells or to following units of the receiver, as the case may be.

The same operations will be repeated for the subsequent pulses arriving on channel 1. More particularly, the decided symbol relative to pulse $x_{i+1}$ will be filtered in component K1 to give the estimated value of the precursor, and this value will be subtracted from pulse $x_i$, purged of the postcursor effects and presented by line LR1 at the input of adder S2. The decision taken in unit D2 will give another correct symbol for signal $x_i$, from which a new precursor value will be obtained in filter K2 and utilized to correct pulse $x_{i-1}$, and so on.

As already mentioned, the presence of several cascaded equalizing cells, which carry out an iterative precursor compensation, allows to correct possible decision errors of units D1, D2. In fact, in case of error for instance of unit D1, the pulses preceding the one on which the decision has been taken would be affected by high intersymbol precursor interference whereas the subsequent pulses would be affected by a higher intersymbol postcursor interference. Consequently, decision device D2 would have to operate on more distorted signals owing to either type of interference or, in the worst case, to both of them.

Nevertheless the probability for unit D2 to make a right decision is still high, as such interference affects the pulse coming from line LR1, which is different from the wrongly decided one appearing in the output of the decision circuit D1. Nevertheless, in case of error also in circuit D2, it is possible for a further decision device D3, which receives a new correction signal obtained from filter K2 as well as the impulse purged of postcursor interference and further delayed in line LR2, to make a correct decision.

Thus, by adding more equalizing cells I can increase the probability of compensating the errors of the preceding cell or cells.

Generally it can be said that a pulse incorrectly decided in the first decision circuit D1 may be present at the subsequent decision circuit D2 with the precursor compensated, unless the subsequent pulse has also been incorrectly decided. If this unfavorable hypothesis comes true and the pulse outgoing from circuit D2 is wrong too, this pulse can be supplied to decision circuit D3 of the subsequent cell, where the interfering sample of the previous signal is more likely to be correctly compensated if the next signal decided by unit D1 is right. This new properly decided signal will compensate the interfering sample of the precursor relative to the previous pulse, which will then be correctly decided by unit D2; the compensation of the precursor of the considered signal will then take place in unit D3, and so on.

Moreover, the presence of a plurality of cascaded cells is particularly convenient also in the case of transmission rates higher than twice Nyquist's rates; in this case, in fact, the transmitted signal will be affected also by a second interfering precursor sample whose influence becomes, however, negligible after passage through a limited number of cells, as can be theoretically estimated in an approximated way.

As far as the circuit of FIG. 2 is concerned, the above-discussed considerations apply to each of the two components (in-phase and quadrature) of the signal to be equalized.

The compensation of the postcursor interference in the nonlinear equalizer with decision feedback formed by blocks SM1, SM2, IS1, IS2, IC1, IC2, DE1 occurs in a well-known manner. Under steady-state conditions, decision device DE1 will supply via output connections 27, 28 decided symbols for which postcursors due both to intersymbol interference and to interchannel interference have been compensated; the values of the precursors of such symbols, obtained from circuits H1, H2, will be subtracted in adders SM3, SM4 from arriving signals which are purged of postcursors and duly delayed in lines DL1, DL2; decision unit DE2 will supply the correct symbols to subsequent units of the receiver or to the following cells of the equalizer.

In the system of FIG. 3, symbol $x_i$ arriving on channel 1 is processed in the same way as already described with reference to FIG. 1. Besides, this raw symbol is sent also to delay line LR30 which presents it at the input of adder S3′, delayed by the time necessary to allow the generation and arrival of the compensating signal.

The value of the interfering precursor sample, obtained as a second approximation in filter K2, as well as a signal of postcursor correction, obtained by feeding back through filter FT2 the decided value supplied by decision device D3′, are subtracted in adder S3′ from the raw symbol $x_i$ which, having been extracted ahead of adder S1, is still affected by postcursors. In this way a more efficient compensation of postcursors can be obtained, as it is carried out by means of a symbol decided on a signal having already been compensated for precursor interference.

In the equalizer of FIG. 4 the raw incoming pulse $x_i$ present at instant $t_i$ on channel 1, and thus on connection 50, is decided in unit D1 and filtered in device G1 to generate the compensation signals for the interfering precursor and postcursor samples.

On the one hand, the compensation signal generated by filter G1 is fed back, through connection 52, circulator CR1, delay line LB1 and connection 50′, to the arriving signal in order to compensate the effects of postcursor interference.

Delay line LB1 will obviously delay the compensation signal by the time necessary to allow the arrival of the pulse distorted by the postcursor of signal $x_i$; the compensated signal will then be decided again in unit D1 and filtered in device G1, to supply the compensation signal relative to the new pulse, and so on.

On the other hand, the compensation signal is sent through connection 52 to adder SO1. This adder receives at the same time, through connection 58, the pulse to be equalized (delayed by line LB1 so as to allow for the arrival of the compensation signal), as well as the postcursor-compensation signal generated by filter G2 on the basis of the symbol previously decided and fed back through circulator CR2 and delay line LB2.

At the output connection 53 of adder SO1, a pulse subjected to the effects both of the precursor and of the postcursor will be present; this pulse will then be decided in unit D2. The same operations are repeated for the pulse following signal $x_i$.

The possible subsequent equalization cells will then reduce the probability of propagating decision errors in the same way as already described.

In FIGS. 5 to 8, where lines LR1, LR2, LR3 ... each introduce a delay equal to the symbol period T, the decided symbols corresponding to the pulses preceding by T, 2T ... the pulse $x_i$, which is present at the input of unit D1, will appear at the outputs of the decision devices D2, D3 ... ; these are signals generating respectively the second, the third and any further postcursor sample interfering with signal $x_i$ while being therewith affected by the precursor samples preceding by T, 2T ... the peak of the pulse which is to be subjected to a decision operation. The signal affected by the first interfering postcursor sample will be present at the output of unit D1.

It will be noted, with reference to FIG. 5, that, for the equalization of postcursor interference, signals emitted by units D1, D2, D3 are sent through connections 3, 8, 12 to multipliers C1, C2, C3 which give rise to the individual compensation signals.

The latter signals are then summed up in adder $\Sigma_1$ so that they may generate an overall compensation signal which will be delayed in line L1 for the time T necessary to allow the arrival of the signal to be compensated.

The signal so purged of postcursor interference will undergo the precursor compensation as described with reference to FIG. 1.

As already mentioned, the structure of the filter inserted into the feedback loop can be simplified with this kind of postcursor compensation.

Moreover, the error propagation due to the interfering postcursor samples following the first one is greatly reduced, as the compensation pulses for such samples are obtained from signals present at the outputs of decision circuits D2, D3 . . . , i.e. from signals which have already been partly equalized.

In FIG. 6 the compensation of the postcursor interference takes place in the same way as described with reference to FIG. 5.

As to the precursor compensation, the symbol purged of postcursor interference and decided in unit D1 goes through connection 3 into filters K1 and K10, which determine a respective value of the interfering precursor sample on the basis of the channel characteristics.

The value calculated by filter K10 arrives, through connection 108, at adder S3″ which receives at the same time, through connection 10, the signal preceding by a time 2T the pulse $x_i$ present at the input of unit D1; as a consequence, the estimated precursor value fed forward by filter K10 compensates the second precursor sample interfering with pulse $x_i$, i.e. the sample preceding by 2T the peak of the response curve generated by that pulse.

The value supplied by filter K1 arrives through connection 5 at adder S2 on whose input connected to link 6 the signal immediately preceding the signal $x_i$ is present; therefore this value compensates the first interfering precursor sample affecting the signal $x_i$. The signal obtained at the output of adder S2, purged a first time of postcursor as well as precursor interference, is then decided in unit D2, filtered in device K2 to generate a new precursor-compensation signal, and fed forward to adder S3″ where it will compensate again the first precursor sample interfering with the signal present at that instant on the input 10 of the same adder.

Thus, at the output of adder S3″ a signal is present for which the first as well as the second interfering precursor samples have been compensated; this signal will then be decided in unit D3, filtered again in device K3 and so on.

Symbols decided by threshold units D2 and D3 are also sent to filters K20, K30 which, in a manner analogous to that of filter K10, send the value of the precursor calculated by them to adders S4′ etc. of the equalization cells where the pulses preceding by a time 2T the pulses decided in units D2, D3 . . . , are present; in such a way the second, third and further compensations of the second interfering precursor sample are obtained.

In the equalizer of FIG. 7, the postcursor effects on signals arriving over channel 1 are compensated a first time by a signal generated by filter F1, as described with reference to FIG. 5; the decided symbols, obtained from pulses with postcursor compensation, are supplied to filter K1 where the value of the precursor is determined; this value is then sent through connection 5 to adder S2′. That adder receives at every time interval T, through connection 111, a second postcursor-compensation signal obtained by processing a second time in filter F2 the signals affected by the interfering postcursor samples separated by a time interval T, 2T, . . . from the peak of the pulse response.

The described operations are repeated at every subsequent cell, by utilizing a new postcursor-compensation signal processed by the feedback filters of these cells.

It is clear that compensating in every cell the postcursor interference simplifies the operations of feedback filters F1 etc. since these units operate not only on the signal decided in the same cell but also on signals for which the effects of precursor and postcursor interference have been compensated one or more times. This applies also to feed-forward filters K1 etc.

Obviously, any increase in the probability of accurate interference compensation by the signals fed back or fed forward by the corresponding filters reduces the probability of decision errors.

What has been said about the circuit of FIG. 7 is essentially applicable to the first two cells of the circuit arrangement of FIG. 8.

Moreover, in the latter circuit arrangement, the second interfering precursor sample is compensated in the same way as in the equalizer of FIG. 6. Consequently, a compensation signal for the first interfering precursor sample (fed forward by filters K2, K3 . . . ), a compensation signal for the second interfering precursor sample (fed forward by filters K10, K20, K30, . . . ) as well as a compensation signal for the postcursor interference (fed back by filters F3 . . . ) will be subtracted, in adder S3$^{IV}$ and in adders of the possible subsequent cells, from signals arriving on connections 10 etc.

Also in this case the individual compensation signals are obtained from symbols derived from the pulses which have undergone iteractive compensations both of precursor and postcursor interference, so that after passage through a very small number of equalization cells the error probability is considerably reduced.

It is evident that the embodiments here disclosed are given only by way of example and not in a limiting sense, and that variations and modifications can be made without going beyond the scope of the invention. Thus, for instance, in case of phase-and-amplitude-modulated signals, if the precursors of the two components of the modulated signal also give rise to interchannel interference, feed-forward filters H1, H2 (FIG. 2) may be replaced by directly connected and cross-connected pairs of filters analogous to the pairs of feedback filters IS1, IC1 and IS2, IC2 which generate postcursor-compensation signals.

Besides, even though the circuits shown in FIGS. 3 to 13 relate to the equalization of base-band signals, they could easily be adapted to the processing of phase-modulated or phase-and-amplitude-modulated signals by changes similar to those necessary for passing from the circuit shown in FIG. 1 to that shown in FIG. 2.

I claim:
1. An equalizer for eliminating the effects of postcursor and precursor interference from a train of incoming digital signals, comprising:
  receiving means connected to a transmission path carrying said incoming signals;
  first threshold means connected to said receiving means for converting a given incoming signal into a first decided pulse having one of several predetermined signal levels;

filter means connected to said first threshold means for deriving from said first decided pulse a feedback pulse adapted to correct postcursor interference and a feed-forward pulse adapted to compensate for precursor interference;

first summing means inserted between said receiving means and said threshold means for algebraically combining said feedback pulse with a subsequent incoming signal;

second summing means having an input connected to said filter means for receiving said feed-forward pulse therefrom;

delay means connected to said receiving means for enbling an algebraic combination of said given signal with a concurrently arriving feed-forward pulse derived by said first threshold means and said filter means from said subsequent signal;

second threshold means connected to said second summing means for converting an output pulse of the latter into a second decided pulse; and a circulator with an input connection to said filter means, an input/output connection to said delay means and an output connection to said second summing means for delivering said feedback pulse from said filter means to said first summing means and said given signal from said delay means to said second summing means.

2. An equalizer as defined in claim 1 wherein said filter means, first threshold means, delay means, circulator and first summing means form part of a first cell; said second threshold means and second summing means being part of a second cell substantially identical with said first cell including other filter means connected to said second threshold means for deriving a second feed-forward pulse from said second decided pulse, a second circulator with an input connection to said other filter means, and other delay means forming part of a two-way connection between said second circulator one the one hand and the first-mentioned circulator and said second summing means on the other hand; further comprising third summing means having inputs connected to said other filter means and to said second circulator for algebraically combining said given signal with a concurrently arriving second feed-forward pulse derived by said first and second threshold means and by the first-mentioned filter means from a still-later incoming signal.

* * * * *